March 9, 1943.   H. RUBINSTEIN   2,313,268
MAKING AND TREATING RAYON CAKES
Filed July 14, 1942

Inventor: Harry Rubinstein
By Louis Shumacher, Atty.

Patented Mar. 9, 1943

2,313,268

UNITED STATES PATENT OFFICE 2,313,268

MAKING AND TREATING RAYON CAKES

Harry Rubinstein, Brooklyn, N. Y.

Application July 14, 1942, Serial No. 450,933

6 Claims. (Cl. 57—76)

This invention is in improvements in the art relating to rayon cakes.

One object of the invention is to provide improvements in the art relating to rayon cakes to accomplish the following purposes:

I. To so wind a cake as to facilitate unwinding thereof without entanglement of its extremely delicate rayon strand.

II. To wind a cake which shall be wholly or partially of conoidal form to permit easy and reliable unwinding thereof into commercial skeins or tubes, or for direct commercial use without intermediate unwinding into skeins or tubes.

III. To wind a cake having a conoidal portion without requiring that the present cylindrical buckets shall be discarded.

IV. To produce or wind a rayon cake in such a manner as to avoid direct handling thereof, with consequent disturbance or distortion of the cake, and resultant entanglement of its strand upon unwinding.

V. To provide a substantially encased rayon cake adapted to be washed and dried while thus supportingly retained against internal shifting.

VI. To provide for the holding of a rayon cake in such a manner as to permit thorough washing thereof without the need for tumbling or lashing the cake.

VII. To provide for the holding of a rayon cake in such a manner as to decrease the drying time thereof very substantially, and as much as 50 percent.

VIII. To provide improved structural means which shall not impede the centrifugal winding of the cake in the bucket and facilitate its removal from the bucket without disturbance of the cake.

IX. To provide improved holding means for the cake, adapted to be automatically locked to the wall of the whirling bucket and to release the same when the bucket stops, and to permit easy removal of the cake from the holding means after drying of the cake.

X. To provide for a stratified winding of the cake to permit easy unwinding without entanglement of the delicate rayon strand.

The invention therefor has among its objects the provision of improved rayon cakes and processes and apparatus relating thereto, which shall fulfill the purposes stated.

This invention is for improvements over those in my application Serial No. 449,338 filed July 1, 1942, for Methods and apparatus for making rayon cakes.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawing, wherein like parts are designated by the same reference characters throughout the several views.

Figure 1:
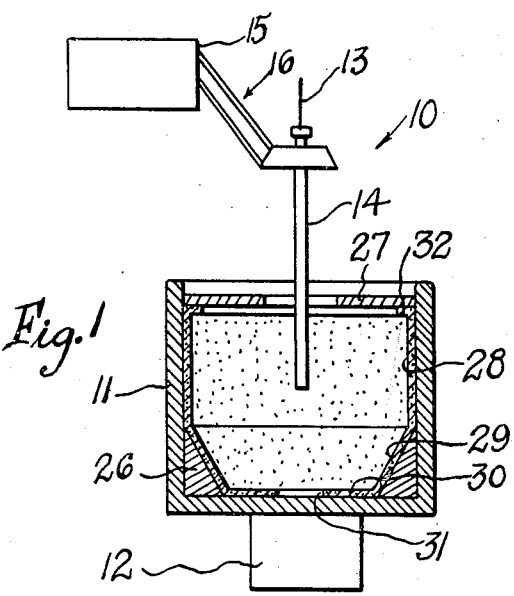
Figure 1 is a diagrammatic vertical sectional view with parts in elevation shown on apparatus embodying the invention and indicating a step in the process.
Figure 3:
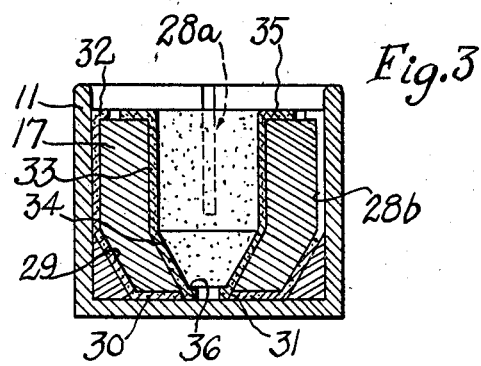
Fig. 3 is a vertical sectional view of the bucket, liner assembly and rayon cake, according to the invention and indicating another step in the process.
Figure 2:
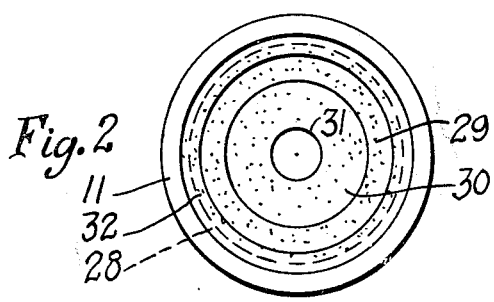
Fig. 2 is a top plan view thereof with parts removed.
Figure 4:
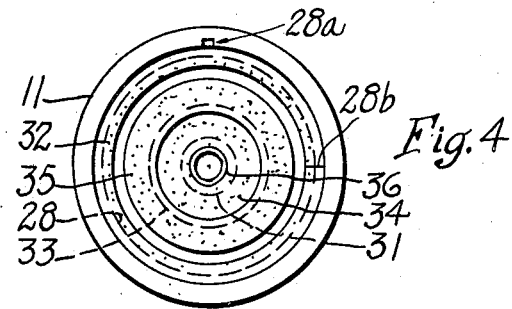
Fig. 4 is a top plan view thereof.
Figure 5:
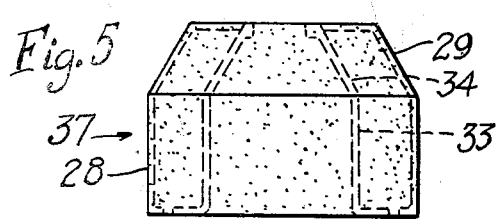
Fig. 5 is a view in side elevation of the inverted rayon cake and liner assembly.

The advantages of the invention as here outlined are best realized when all of its features and instrumentalities are combined in one and the same structure, but, useful devices may be produced embodying less than the whole.

It will be obvious to those skilled in the art to which this invention appertains, that the same may be incorporated in several different constructions. The accompanying drawing, therefore, is submitted merely as showing the preferred exemplification of the invention.

In the manufacture of rayon yarn, one illustrative process provides for the softening of cellulose sheets with sodium hydroxide, after which these sheets are shredded, the resulting product being treated with a carbon bisulphide, then with dilute sodium hydroxide, ripened, filtered, and finally expressed through minute orifices to form filaments which are hardened in a solution to produce a somewhat tacky rayon strand from which the rayon cake is made. This so called rayon cake is of the form of a tube whose length is usually approximately equal to its diameter and the wall of which is quite thick. For example, the diameter may be about six and one half inches, the height about five inches, and the wall about one and one quarter inches in thickness. It may contain about 30,000 yards of the rayon strand. This cake is made by centrifugally laying the yarn against the inside wall of a bucket that rotates at high speed, for example, at about 6500 R. P. M., to thus wind the strand, while an axially reciprocating tubular feeder in the bucket causes the coil to be uniformly laid to thus produce the cake. The latter is then washed and dried to obtain the finished rayon yarn. This washing requires many hours and the drying also requires many hours, although various expedients are employed to hasten these operations. Finally the cake is rewound, to produce commercial skeins, tubes and cones, such as are used by knitters and the like.

The rayon strand as used in the bucket is relatively delicate and becomes easily displaced, so that upon rewinding, considerable entanglement and breakage occurs with great loss of material and labor. I have perceived that the handling of the rayon cake by the operators is an important cause of this. For instance, the rayon cake is pulled out of the bucket by hand, and is then directly manually mounted in the washing machine, and is then directly manually mounted in the drying machine. Also considerable other intermediate handling occurs, all of which contributes to cause distortion of the rayon cake, internal shifting thereof and displacement to contribute to eventual entanglement upon unwinding. This handling is avoided by the present invention, since the cake is disposed in a shell which is at least semi-rigid. In washing the cake, the same is beaten or agitated; it loses its former body and becomes quite limp, and this adds to the difficulties above noted. For drying, it is hung up in the manner of a skein, and becomes almost one solid lump so that drying must occur through a mass twice the thickness of the wall of the cake. Of course great numbers of these cakes are washed and dried simultaneously. But with the present invention these drawbacks in the washing and drying are avoided. In fact, the dried rayon cake need not necessarily be rewound, but may be sold as a commercial product for direct use by knitting concerns.

Referring in detail to the drawing, 10 denotes a device embodying the invention. The same may includes a cylindrical bucket 11 mounted axially upon an actuator 12 which whirls the bucket at extremely high speed. A rayon strand 13 is fed to the bucket by an axially reciprocating feed tube 14 therein which may be operated by an actuator 15 and a pivoted pair of arms 16 forming a parallelogram, or by any other suitable means.

The invention includes the utilization of the usual means above described to provide a rayon cake such as 17 or 18, embodying the invention. Since the direction of unwinding is upward as indicated by the yarn 19, I have perceived that the yarn disturbs the coils adjacent to the outer top corner or edge of the rayon cake; it tends to lift and displace adjoining turns of yarn and is a fruitful cause of the entanglement of yarn. This is avoided by the formation of the upper conoidal region 20 of the rayon cake. As a result, the internal region 21 of the cake is no longer cylindrical, but likewise assumes a conoidal shape as shown at 22; this results from the method of making this cake as hereinafter described. The cake 18 has some advantages over that shown at 17, since it is conoidal throughout; its internal axial opening 23 is similarly conical, with the top opening 24 being substantially smaller than the bottom opening 25. This cake 18 affords at all points the advantages of the conical shape in unwinding. Thus when the unwinding proceeds in an upward direction, as it alternately does, the yarn tends to lift and loosen upper adjacent turns of yarn and frequently tries to drag them prematurely along, causing twisting, buckling and entanglement, and of course this may occur at various points in the cake. Hence the continuously conical shape is best, although the form at 17 cures the source of most of the evil. On the other hand the form at 17 affords the most capacity for a given diameter, and hence is of particular advantage for utilizing the buckets 11 already available.

To form the cake 17 the invention contemplates a method and apparatus which can be practised by axially fitting or non rotatably securing a conoidal ring member 26 in the usual bucket 11. With this simple change the cake 17 is wound centrifugally with the feeder 14 reciprocating up and down. In consequence the inner opening is conoidal as at 22, because the yarn is wound uniformly throughout. To produce the cake 18, a corresponding shaped conoidal ring member may be substituted for that at 26, as will be obvious. If desired, the bucket 11 may be replaced by another whose original internal contour may be as indicated in connection with the ring inserts. During the winding, the bucket may be desirably closed as by a removabble cover 27, having a central opening for the feeder 14.

Beside producing the advantages already noted for the cake 17 and 18, the making of the conoidal shape results in a superior winding as there is a better support for the turns of yarns. This support will be greater in proportion as the conicity is increased. It assures against accidental shifting of yarn in the vertical direction, causing the yarn to catch or stick upon unwinding the cake.

Figure 6:
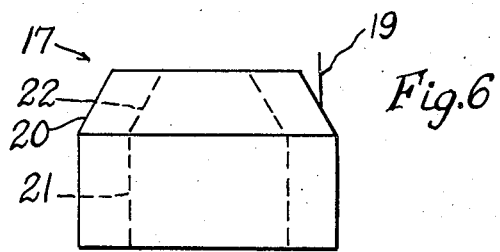
Fig. 6 is a view in elevation of the rayon cake.
Figure 7:
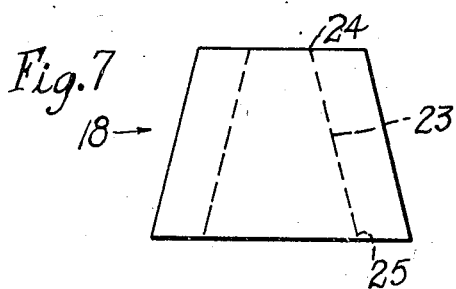
Fig. 7 is a view in elevation of a modified rayon cake.

It will of course be readily apparent that the cake as produced in the bucket is inverted to the unwinding position shown in Figs. 6 and 7.

To properly preserve the advantages afforded by the rayon cakes 17 and 18, the conoidal portions should not be upset or distorted by manual handling as upon removal from the bucket. Accordingly I provide a liner 28 having a conoidal portion 29 to conform to the desired shape of the cake 17, or being conoidal throughout for the cake 18. This liner may have a bottom wall such as a flange 30, desirably formed with a central opening 31 for a purpose hereinafter described. By the provision of this flange 30, the rayon strand may be uniformly laid at the bottom, and constitutes a support whereby the cake may be reliably removed from the bucket. An annular top lip 32 may be permanently or detachably affixed to the liner and may serve to protect the upper outer edge of the cake and to afford a grip for withdrawing the liner from the bucket. This lip 32 is comparatively narrow, if permanently affixed to the liner, it permits the rayon cake to be removed from the liner past the same after shrinkage upon washing and drying.

To cause the liner 28 to be reliably whirled with the bucket 11, it may be non rotatably secured to the bucket in any suitable manner. For example, one or more keyways may be used as shown at 28a, or a clutch engagement may be used operative by centrifugal force so that the liner is released automatically upon removal of the bucket from its whirling actuator means 12. For this purpose the material of the liner 28 may be sufficiently elastic or yielding as to be expansible by centrifugal force to powerfully grip the bucket; a minute enlargement of the liner may suffice for this purpose. Or the liner may be split at 28b throughout or partially as shown, so as to function like a split ring or tube for resilient expansibility. If preferred, the keyway may be used additionally. At the split, the edge portions of the liner may be releasably interconnected in any suitable manner, as by a dovetail connection formed by cutting or stamping the edge portions.

After the rayon cake has been completed, an inner liner such as 33 is preferably inserted into the axial opening of the cake, after removal of the cover 27 and while the cake and its liner 28 are still in the bucket. This liner 33 is adapted to smoothly fit said cake opening, and hence may have a conoidal section 34. At its top, it may have an outwardly directed annular flange 35 overlaying the cake, and at its bottom, it may fit closely in the opening 31 of the outer liner. This bottom portion may be suitably annularly reenforced as at 36. If a cake 18 is made, an inner liner conforming to its opening 23, but otherwise similar to the liner 33 may be employed. The assembly of cake, and outer and inner liners may now be removed from the bucket 11 without in any way disturbing the rayon cake; this assembly is shown at 37.

It is a feature of this invention that an assembly such as 37 may be utilized for washing and even for drying of the cake, so that the latter is not directly handled at any stage but is always protectively enclosed. In order to permit the washing liquids to have ample access to the cake, the liners 28 and 33 may be porous or foraminous throughout; otherwise these liners could be made of any suitable material. The term foraminous may include a multitude of small openings which are suggestively indicated by the dots. These small openings can be provided by drilling or punching, or by forming the liners from mixtures containing particles dissolved out to leave a highly porous or foraminous wall. The assembly 37 as thus characterized may be disposed in movable relation to jets of washing liquid of sufficient power to penetrate through many different parts of the liners for thoroughly washing the rayon cake.

In drying the rayon cake, the assembly 37 may be subjected to required heat applied internally as well as externally. Thus heat, with the desired humidity may be produced within the liner 33 as well as about the liner 28. The open passage of the liner 33 will afford necessary circulation. In consequence, the heat need penetrate only one-half the thickness of the wall of the rayon cake, causing a very great increase in the rate of drying. Moreover, the assembly 37 may be whirled, if desired, for centrifugal drying in aid of the application of heat. When dried, substantial shrinkage has occurred, so that the inner liner 33 may be easily removed and the cake slipped out of the liner 28 past the lip 32 thereof. The cake may now be sold commercially for use by knitters without rewinding, or it may be rewound as preferred.

In some cases both the washing and the drying may be accelerated by forming the liners 28 and 33 of a yielding material such as pressed fiber to permit the use of axial intermittent pressure on the assembly 37, causing breathing or filling of the liquid to facilitate washing, and expulsion of liquid to expedite drying. The deformation produced by such intermittent pressure may be rather small so as not to disturb the rayon turns in the cake.

Figure 8:
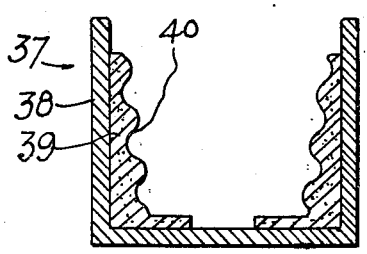
Fig. 8 is a vertical central sectional view of a modified apparatus according to the invention.

In Fig. 8 is shown a modification comprising a bucket 38 like that at 11, but having therein a relatively non rotatable liner 39 formed with a helical or spiral screw thread 40, preferably the latter, with smooth undulating curves for a stratified winding. The speed of reciprocation of the feeder 14 may be sufficiently great that upon downward movement, for instance, it causes the yarn to follow the spiral thread to lay the yarn strand accordingly. Upon upward movement of the feeder, at the same speed the rayon strand will follow a path intersecting the line of the thread, and upon return downward movement, it will again follow the thread, thus producing at least in part a stratified winding aiding in unwinding of the cake. This feature may be used in the lining 28, but in general a smooth surface such as that afforded by the liner 28 has important advantages for centrifugal winding of a delicate rayon strand.

It will be noted that the advantages of the liners 28 and 33 are available even without using the conoidal portion or shape. It will be appreciated that the inner liner 33 may be placed in the cake after removal of the latter with the liner 28 from the bucket. In fact, if the cake be made in a cylindrical or conoidal bucket, it may be removed and then encased in a housing such as 28, 33 for the subsequent treatments. In the process, the order of certain steps may be changed, and certain steps may be omitted or replaced by other steps.

I claim:

1. The herein described method including engaging with a bucket a tubular liner having a side wall and a bottom wall portion, whirling the bucket with its liner while axially feeding rayon strand for centrifugally winding the same to produce a ring shaped rayon cake in the liner, disposing a second liner in fitted relation in the opening of the cake, and removing the cake and liner assembly from the bucket for subsequent treatment.

2. The method according to claim 1 wherein said liners are made of foraminous material, and the cake is washed through said liners.

3. The method according to claim 1 wherein said liners are foraminous, and the cake is washed and dried while retained in shape by said liners.

4. The method according to claim 1 wherein said liners are yieldable in an axial direction and the cake and liner assembly is subjected to intermittent axial pressure during said subsequent treatment for propelling liquids relative to the strand of the cake.

5. Apparatus including a whirling bucket for centrifugally winding a rayon strand to form a rayon cake, an expansible liner in the bucket removably engaged therewith for whirling with the bucket, a spiral thread in the wall of the liner, and an axial reciprocating strand feeder moving at such speed that at least part of the strand is wound in the thread.

6. The method of making a rayon cake out of a strand which has been hardened but not washed and dried, including centrifugally winding said strand in a whirling bucket having a conoidal annular portion at least at the lower portion of its side wall, said cake being removed from the bucket for washing and drying and being then inverted so that it tapers upward for winding.

HARRY RUBINSTEIN.